United States Patent
Gregersen (10) Patent No.: US 10,428,961 B2
(45) Date of Patent: Oct. 1, 2019

(54) SANITARY DIVERTER VALVE, DRYING SYSTEM INCLUDING AN IMPROVED VALVE ASSEMBLY COMPRISING SUCH A VALVE, AND METHOD OF CLEANING THE SYSTEM

(71) Applicant: GEA Process Engineering A/S, Søborg (DK)

(72) Inventor: Morten Gregersen, Haslev (DK)

(73) Assignee: GEA PROCESS ENGINEERING A/S (DK)

( * ) Notice: Subject to any disclaimer, the term of this patent is extended or adjusted under 35 U.S.C. 154(b) by 0 days.

(21) Appl. No.: 16/309,953

(22) PCT Filed: Jun. 20, 2016

(86) PCT No.: PCT/IB2016/053655
§ 371 (c)(1),
(2) Date: Jan. 28, 2019

(87) PCT Pub. No.: WO2017/221048
PCT Pub. Date: Dec. 28, 2017

(65) Prior Publication Data
US 2019/0136990 A1    May 9, 2019

(51) Int. Cl.
*F16K 11/087* (2006.01)
*F16K 27/06* (2006.01)
*F16K 24/02* (2006.01)

(52) U.S. Cl.
CPC .......... *F16K 11/0873* (2013.01); *F16K 24/02* (2013.01); *F16K 27/067* (2013.01); *Y10T 137/043* (2015.04); *Y10T 137/0424* (2015.04)

(58) Field of Classification Search
CPC .... F16K 11/0873; F16K 24/02; F16K 27/067; Y10T 137/0402; Y10T 137/0419; Y10T 137/0424; Y10T 137/043
See application file for complete search history.

(56) References Cited

U.S. PATENT DOCUMENTS 2,008,248 A     7/1935   Fluck
2,492,151 A *  12/1949  Holm ................... F16K 11/0873
                                                     137/625.11
(Continued)

FOREIGN PATENT DOCUMENTS

CN      104 888 599 A     9/2015
DE       41 03 976 A1     7/1991
(Continued)

*Primary Examiner* — Ian G Paquette
(74) *Attorney, Agent, or Firm* — Condo Roccia Koptiw LLP (57) ABSTRACT

The sanitary diverter valve (70) is for use in a drying system or powder conveying system including conveying lines and a purge line of a purge arrangement. The sanitary diverter valve comprises a valve housing (71) with a number of openings (72, 73, 74) configured to be connected to respective lines of the system. The valve housing (71) is substantially cylindrical and includes a first opening (72), a second opening (73) and a third opening (74). Furthermore, the diverter valve (70) comprises a rotatable diversion member (75) provided with a flow channel (76) having a first end (76a) and a second end (76b), an open space (77) being defined between the valve housing (71) and the rotatable diversion member (75). The rotatable diversion member (75) is configured to be rotated between a first position and a second position to allow that fluid communication is selectively provided between the first opening (72) and the third opening (74) and between the first opening (72) and the second opening (73) of the valve housing (71).

8 Claims, 5 Drawing Sheets

(56) References Cited

U.S. PATENT DOCUMENTS

| | | | |
|---|---|---|---|
| 3,047,020 A | 7/1962 | Barrett, Jr. | |
| 3,473,550 A | 10/1969 | Van Scoy et al. | |
| 6,000,430 A | 12/1999 | Nafz | |
| 6,148,788 A * | 11/2000 | Brueggemann | F01M 11/00 123/196 S |
| 2007/0068584 A1 * | 3/2007 | Murdock | F16K 5/0605 137/625.47 |

FOREIGN PATENT DOCUMENTS

| | | |
|---|---|---|
| DK | 2015 70712 A1 | 11/2015 |
| EP | 0 842 375 A1 | 5/1998 |
| EP | 1 801 474 A1 | 6/2007 |
| EP | 2 306 097 A2 | 4/2011 |

\* cited by examiner

Conveying Air
Purge Air
CIP Liquid
Dry Out Air

SANITARY DIVERTER VALVE, DRYING SYSTEM INCLUDING AN IMPROVED VALVE ASSEMBLY COMPRISING SUCH A VALVE, AND METHOD OF CLEANING THE SYSTEM

CROSS REFERENCE TO RELATED APPLICATIONS

This application is the National Stage Entry under 35 U.S.C. § 371 of Patent Cooperation Treaty Application No. PCT/IB2016/053655, filed 20 Jun. 2016, the contents of which are hereby incorporated by reference herein.

FIELD OF INVENTION

The present invention relates to a sanitary diverter valve for use in a drying system or powder conveying system including one or more conveying lines and at least one purge line of a purge arrangement, comprising a valve housing having a number of openings configured to be connected to respective lines of the system. The invention furthermore relates to a drying system comprising at least one powder recovery unit, at least one conveying line for powdery material such as fines from the powder recovery unit, at least one purge line connected to a purge arrangement, and a valve assembly comprising at least one sanitary diverter valve. The invention furthermore relates to a method for cleaning a system.

BACKGROUND OF THE INVENTION

In such drying systems, including spray drying systems, there are means for transporting powdery material from powder recovery units such as cyclones and bag filters downstream of the drying chamber to upstream units such as to relevant positions of the drying chamber itself or to a finishing treatment unit such as a vibrating fluidizer or integrated/static fluid bed for handling the material discharged from the drying chamber. Typically, such conveying lines are configured to transport powdery material in the form of fines, that is, powdery material of satisfying composition but of a size and/or configuration that needs further processing in order to fulfil quality requirements, i.e. a so-called fines return system, during normal operation, and the same conveying lines are often used for transporting powdery material to the drying chamber and for transporting powdery material to a finishing treatment unit by having one or more multiple diverter valves in line with the conveying lines. Such diverter valves will direct the flow from the powder recovery units to one of a number of destinations. The conveying lines leading from the diverter valve to non-active destinations are thus empty. These non-active conveying lines are known as idling lines. Due to the high temperatures, which are commonly present in spray drying systems, the idling lines have a lower temperature than the active lines, and as such any moisture in the air, will condensate in the idling lines. Thus, when switching the diverter valve to activate a formerly idling line, the powdery material will enter a moist section, which is to be avoided for the hygroscopic and sticky characteristic reasons mentioned above as well as hygienic and bacterial reasons. A common solution to this problem is to add a purge gas valve after each exit of the diverter valve, as close to the valve as possible, in order to run purge gas through the idling lines in order to remove the condensation. This solution, while alleviating the problem somewhat has some limitations as the purge gas valve can never be placed close enough to the diverter valve, in order to remove all moisture. As such, some moisture will be present.

Cleaning requirements for the drying and powder handling equipment, i.e. the so-called dry areas, can be met by either dry or wet methods, or a combination of both. Dry methods involve manual sweeping of surfaces in contact with the product, or air sweeping by allowing a high velocity air stream to pass over the surfaces in question. Wet methods involve either manual hosing of surfaces or more effectively by use of automated cleaning-in-place systems (CIP systems).

The very nature of e.g. dairy and food products means that the possibility of product deposits formation on the surface of the process equipment is always real. The products' fat, sugar and protein content, gives hygroscopic and sticky characteristics at the temperature and humidity conditions present during processing. For drying plants in general, it is often relevant and profitable to equip the plants with automatic CIP in order to reduce the downtime of the plant. The risk of deposit formation increases with the running time of the plant. Industrial CIP systems can clean individual items or complete process plants, involving integrating cleaning nozzles into the plant components together with their associated pipe work, and instrumentation.

The complex nature of the cleaning regimen is particularly pronounced in spray drying systems comprising a fines return system. In such systems, it is of course vital that the conveying line for the stream of powder is thoroughly dried by air or other gas after wet CIP to ensure that the stream of powder in the conveying line is not compromised by any remains of moisture.

Although such CIP systems provide a thorough cleaning, it is also a challenge that the CIP liquid needs to be drained and the parts involved need to be dried very thoroughly in order to avoid the risk of contamination and subsequent sticking of product. It is not uncommon that cleaning regimens do not involve all parts of such a spray drying system to be cleaned by CIP. This applies in particular to the dry sections of the system, including typically the fines return system.

SUMMARY OF THE INVENTION

With this background, it is therefore an object of the present invention to provide a sanitary diverter valve for a drying system or powder conveying system by which the overall operational conditions of such a system are improved.

It is a further object to increase the efficiency of the cleaning process and improve the hygiene conditions in such a system even further.

In a first aspect of the invention, these and further objects are obtained by a sanitary diverter valve of the kind mentioned in the introduction, which is furthermore characterised in that the valve housing is substantially cylindrical and includes a number of openings including a first opening, a second opening and a third opening; and a rotatable diversion member provided with a flow channel having a first end and a second end, an open space being defined between the valve housing and the rotatable diversion member; that said rotatable diversion member is configured to be rotated between a first position in which the first end of the flow channel is located opposite the first opening of the valve housing and the second end of the flow channel is located opposite the third opening of the valve housing, and a second position in which the first end of the flow channel is located opposite the second opening of the valve housing and the second end of the flow channel is located opposite the first opening of the valve housing, such that fluid communication is selectively provided between the first opening and the third opening and between the first opening and the second opening of the valve housing; and that fluid communication is provided between the open space and the second opening of the valve housing in the first position and between the open space and the third opening of the valve housing in the second position.

The provision of such a sanitary diverter valve makes it possible to handle not only powder during normal operation but also liquid and air/gas. In turn, this makes it possible to clean the conveying lines of the system and the valve assembly including the diverter valve itself very thoroughly.

The sanitary diverter valve is generally applicable to systems in which powder is handled and in which the sanitary requirements are such that the conveying lines and the valve assemblies of the system must be cleaned on a regular basis. Hence, the sanitary diverter valve may be used for powder conveying systems as well as drying systems. Typical products subject to high sanitary standards include dairy, food, chemical, agro-chemical, energy, biotechnology, pharmaceutical, healthcare etc.

In a presently preferred embodiment of the invention, the flow channel of the rotatable diversion member comprises two channel sections extending at a relative angle to each other, and wherein the second opening and the third opening of the valve housing are positioned such that a central angle between the second opening and the third opening is two times the relative angle. This provides for a mechanically simple structure of the sanitary two-way diverter valve which is particularly easy to clean.

The choice of a suitable angle between the angled channel sections is made in accordance with the desired configuration of the pipe layout in the system in which the two-way sanitary diverter valve is to be installed, In a further development of this presently preferred embodiment, the angle is in the range 5° to 85°, preferably 10° to 45°, more preferably 20° to 30°, most preferred about 22.5° corresponding to an included angle β of 157.5° of the angled channel sections of the flow channel. Thus, a wide range of angles are possible, and in the most preferred interval, an optimum balance between the considerations to system configuration and easy operation of the diverter valve is found.

In another embodiment, a seal is provided between the valve housing and one or more of the respective first, second and third openings of the number of openings of the valve housing.

In a second aspect, a drying system is provided, in which the sanitary diverter valve of the valve assembly is connected to said at least one conveying line and said at least one purge line, such that the sanitary diverter valve is configured to be operated as a two-way diverter valve selectively for liquid, air/gas and/or powder.

This provides for excellent hygienic properties as the system is easy and efficient to clean and subsequently dry thoroughly. Furthermore, as the sanitary diverter valve is able to be operated as a two-way valve, less valves are needed compared to traditional systems.

The drying system may be any system in which powder is handled and comprise any operational units, and as such also powder handling systems are incorporated. However, the principles underlying the invention are particularly useful in a drying system comprising a spray dryer with a drying chamber and a process gas supply device.

In a presently preferred embodiment, the drying system furthermore comprises a cleaning-in-place, CIP, arrangement connected to said at least one purge line. This allows for particularly thorough cleaning of the system.

In a further embodiment, the valve assembly comprises a second valve connected to the two-way sanitary diverter valve via a fourth opening included in the number of openings of the valve housing, said fourth opening being in fluid connection with the open space of the two-way diverter valve. This provides for a mechanically simple and reliable valve assembly which allows for ease of operation and cleaning. In further developments, the second valve is configured to be brought in fluid connection with the at least one conveying line and with the at least one purge line, and it is preferred that the second valve is a plug valve having a plug end adapted to close off the fourth opening of the valve housing.

In an alternative application, a by-pass arrangement is provided, comprising at least one further two-way sanitary diverter valve connected to a secondary conveying line optionally connectable to a secondary destination. This configuration provides for optimum flexibility in operation of the drying system.

In a third aspect of the invention, a method for cleaning a system of the type described above is provided.

BRIEF DESCRIPTION OF THE DRAWINGS

The invention will be described in more detail below by means of non-limiting examples of presently preferred embodiments and with reference to the schematic drawings, in which.

DETAILED DESCRIPTION OF EMBODIMENTS OF THE INVENTION

Figure 1:
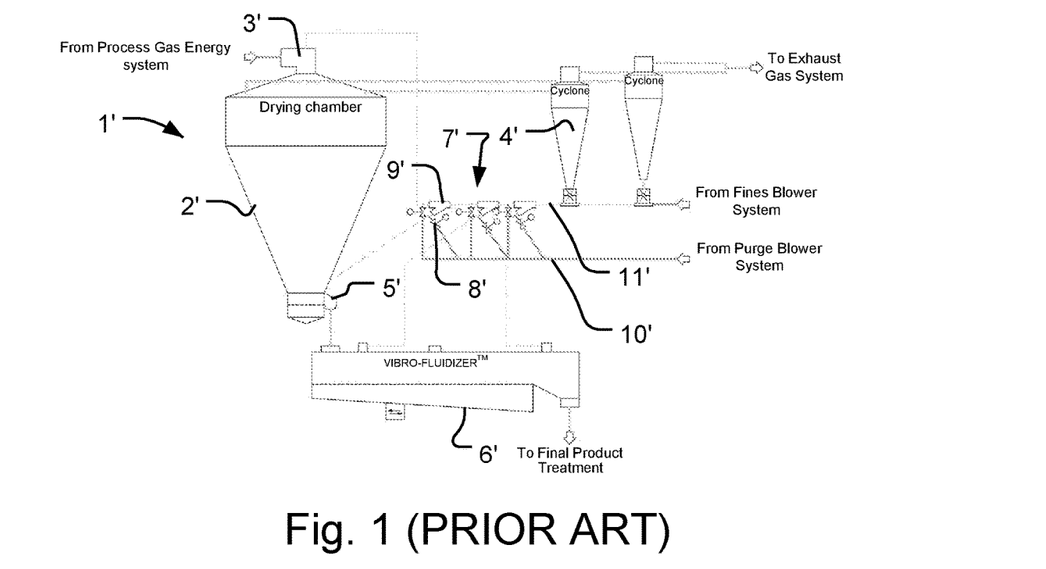
FIG. 1 shows a schematic view of a prior art spray drying system.
Figure 2:
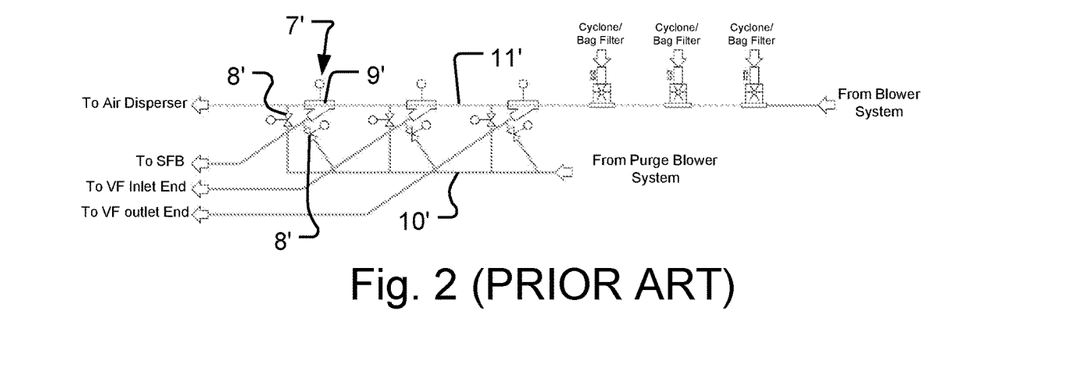
FIG. 2 shows a functional flowchart indicating the flows in operation mode and purge mode, respectively, of a prior art spray drying system.

FIG. 1 shows a schematic view of the main components of a spray drying system 1'. In a manner known per se, the spray drying system 1' comprises a spray dryer with a drying chamber 2' and a process gas supply device, typically including an air disperser 3'. It is noted that the term "gas" will be used alongside with the term "air" and is to be interpreted as encompassing any gas that is suitable as process gas in such a spray drying system. The drying chamber 2' also incorporates atomizing means, such as nozzles and/or an atomizer wheel.

At the lower end of the drying chamber 2', an outlet 5' for dried material is provided. In the shown spray drying system 1', an after-treatment unit in the form of a vibrating fluidizer 6' or integrated static fluid bed is provided. At one end, the vibrating fluidizer 6' receives dried material from the outlet 5' of the drying chamber 2' for further treatment of the material, which is then to be collected at an outlet at the other end of the vibrating fluidizer. Further downstream equipment may be present as well, but is not relevant to the present invention.

Furthermore, the spray drying system 1' comprises at least one powder recovery unit 4', to which spent process gas with particles entrained in the process gas is conducted via an exhaust line (not indicated). The powder recovery units 4' may take the form of cyclones or bag filters, or any combination thereof.

A conveying line 11' is provided for transporting the powdery material recovered in the powder recovery unit 4' to upstream equipment such as the drying chamber 2' itself, at an arbitrary position such as at the air disperser 3 and/or to the chamber bottom cone, or to the vibrating fluidizer 6' or integrated static fluid bed, likewise to an arbitrary position in these units. Typically, the recovered material is in the form of fines, which are powdery material of satisfying composition but of a size and/or configuration that needs further processing in order to fulfil quality requirements. The position of introduction of the fines return into the upstream units typically depends on the size and/or configuration of the material and of the prevailing operating conditions in the drying chamber 2' and the vibrating fluidizer 6'. A valve assembly 7' is present in the system as well in order to ensure proper sorting and distribution of the returning fines to upstream units and to ensure that the spray drying system may be purged, i.e. blown through by a gas or air. To this end, purge valves 8' are connected to respective diverter valves 9' to allow a purge gas to be supplied via a purge line 10'.

In the following, an embodiment of the drying system according to the present invention will be described. Elements having the same, analogous, or corresponding function as in the prior art spray drying system will be denoted by the same reference numerals as in the description of the prior art spray drying system, with the exception that the mark of the description of the prior art spray drying system has been removed. In the following, the drying system will be described in the form of a spray drying system. It is to be understood, however, that the principles of the invention are applicable to any kind of drying system comprising one or more powder recovery units, a conveying line for the transport of powder, and a purge line. Examples of such drying systems include spray drying systems comprising operational units other than the ones shown and described, fluid bed systems, flash drying systems etc.

Figure 3:
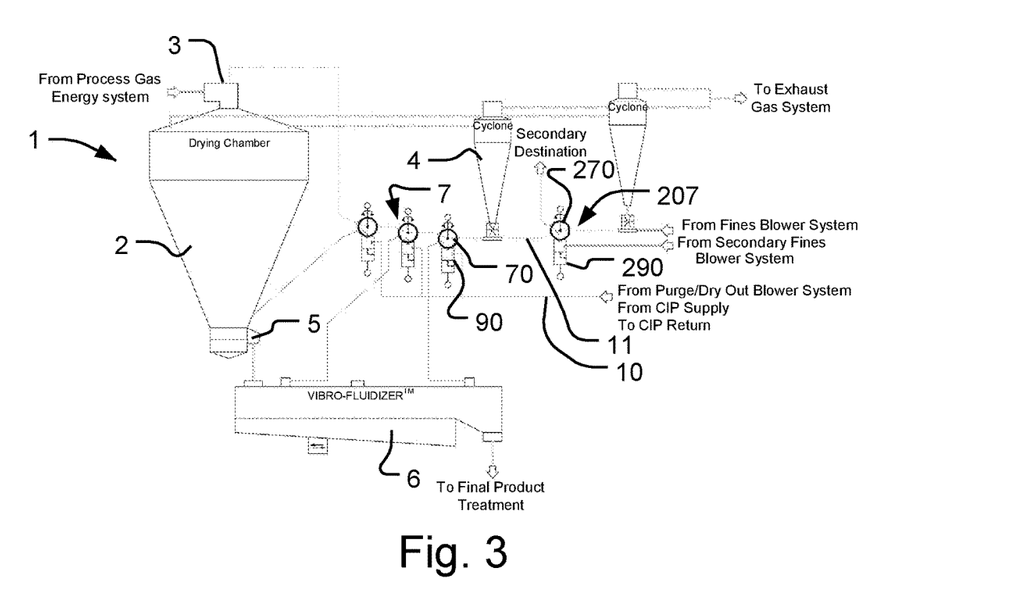
FIG. 3 shows a schematic view of an embodiment of the drying system according to the invention.

Referring now to FIG. 3, the spray drying system 1 of the present embodiment comprises a spray dryer with drying chamber 2 and process gas supply device in the form of an air disperser 3. At least one powder recovery unit is present, here two cyclones 4. A conveying line 11 for powdery material from the cyclones 4 leads to a set of valve assemblies 7, here three sets of valve assemblies 7.

From the valve assemblies 7 fines are conveyed through further conveying lines (not indicated) to various locations in upstream units including the drying chamber 2 or to the vibrating fluidizer 6 or integrated static fluid bed.

The valve assemblies 7 are also connected to a purge line 10, which in the embodiment shown also functions as a conduit for CIP liquid and dry out air to be described in further detail below.

Arrangements for providing conveying air and purge air are also present in the spray drying system although not indicated in detail in the drawings.

Figure 4:
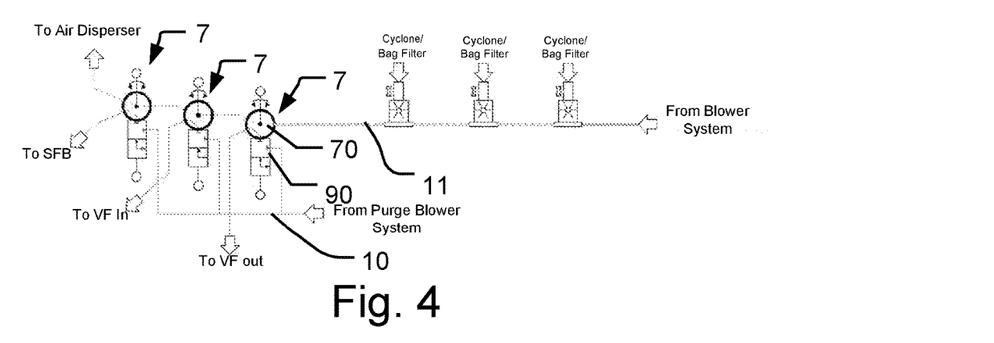
FIG. 4 shows a schematic flowchart of an embodiment of the drying system according to the invention.

FIG. 4 shows a schematic flowchart of details of the spray drying system including the valve assemblies 7 in another embodiment.

Referring now in particular to FIGS. 5 to 7 and 10 to 12, the valve assembly 7 comprises a sanitary two-way diverter valve 70 according to the invention. The diverter valve 70 is provided with a substantially cylindrical valve housing 71 having a number of openings including a first opening 72, a second opening 73 and a third opening 74.

Figure 5:
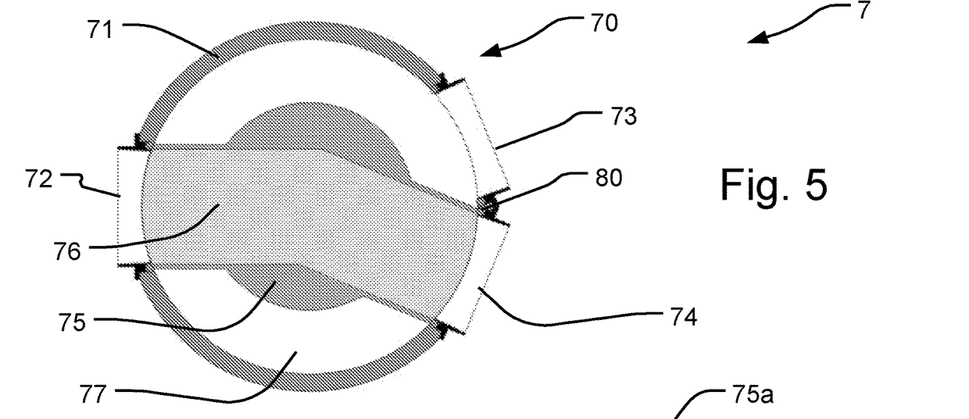
FIG. 5 shows a schematic plan view of a diverter valve of a valve assembly in an embodiment of the drying system according to the invention.
Figure 6:
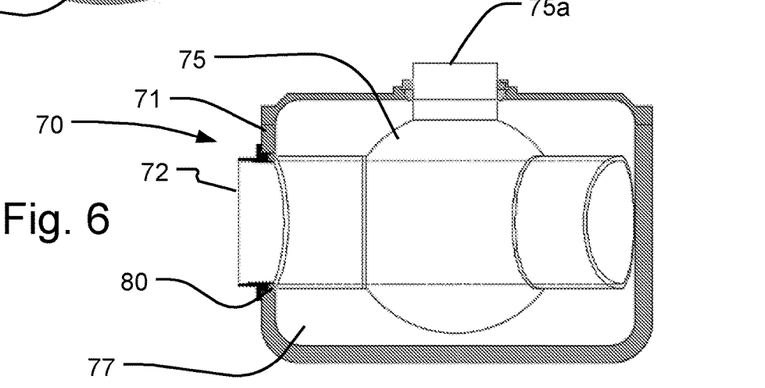
FIG. 6 shows a side view of the valve assembly of FIG. 5.
Figure 7:
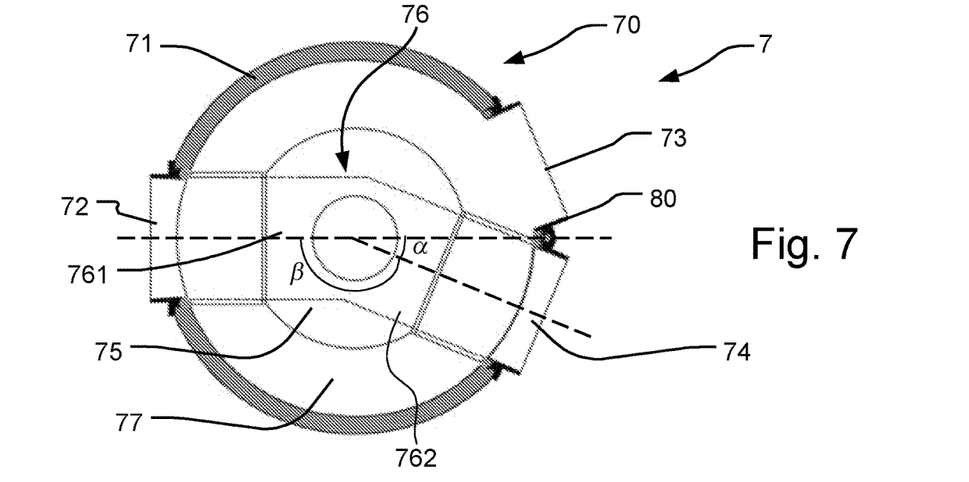
FIG. 7 shows a plan view of the valve assembly of FIGS. 5 and 6.

In the installed condition, the first opening 72 may be connected to the conveying line 11, and the second and third openings 73, 74 to further conveying lines leading from the valve assembly 7 as described in the above.

A rotatable diversion member 75 is located in the housing 71 and is connected thereto by means of shaft stub 75a journaled in a top wall of the housing 71. The diversion member 75 is provided with a flow channel 76 having a first end 76a and a second end 76b. An open space 77 is defined between the valve housing 71 and the rotatable diversion member 75. It is noted that the open space 77 of the valve housing 71 should have a volume of the same magnitude as the volume of the rotatable diversion member 75 in order to ascertain good flow conditions in the valve housing 71. For instance, it is conceivable to have a ratio between the volume of the open space 77 and the volume of the rotatable diversion member 75 in the range of 1:4 to 1:1, although any ratio suitable to the person skilled in the art is conceivable.

Figure 10:
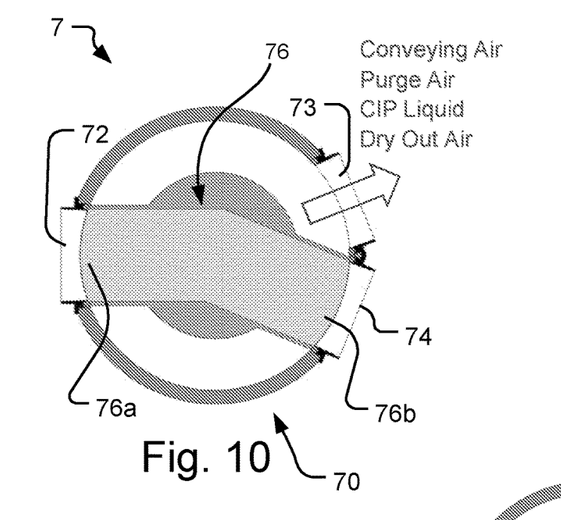
FIG. 10 is a view corresponding to FIG. 5 of a valve assembly in an embodiment of the spray drying system according to the invention, in a first position and indicating flows through the diverter valve.
Figure 11:
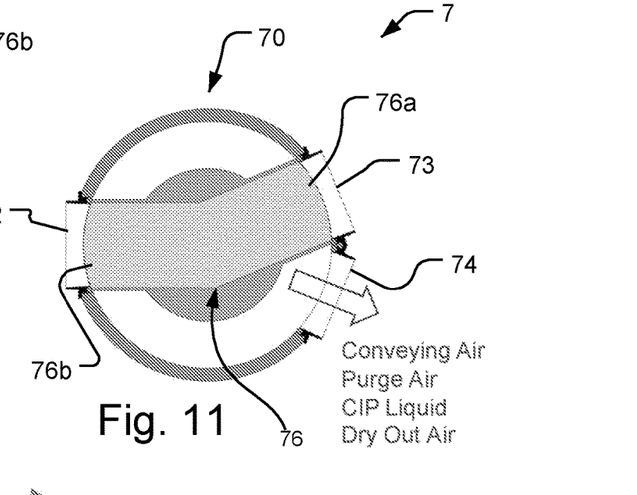
FIG. 11 is a view corresponding to FIG. 5 of a valve assembly in an embodiment of the drying system according to the invention, in a second position and indicating flows through the diverter valve.

The rotatable diversion member 75 is configured to be rotated between a first position, shown in FIGS. 5 to 7 and 10, in which the first end 76a of the flow channel 76 is located opposite the first opening 72 of the valve housing 71 and the second end 76b of the flow channel 76 is located opposite the third opening 74 of the valve housing 71, and a second position, shown in FIG. 11, in which the first end 76a of the flow channel 76 is located opposite the second opening 73 of the valve housing 71 and the second end 76b of the flow channel 76 is located opposite the first opening 72 of the valve housing 71. In this manner, fluid communication is selectively provided between the first opening 72 and the third opening 74 and between the first opening 72 and the second opening 73 of the valve housing 71. In turn, this means that fluid communication is provided between the open space 77 and the second opening 73 of the valve housing 71 in the first position and between the open space 77 and the third opening 74 of the valve housing 71 in the second position.

In the specific embodiment, the flow channel 76 of the rotatable diversion member 75 comprises two channel sections 761 and 762 extending at a relative angle $\alpha$ to each other (cf. in particular FIG. 7).

The angle $\alpha$ may in principle be chosen freely as long as it is possible to position the rotatable diversion member 75 with the channel sections 761, 762 of the flow channel 76 opposite the openings 71, 72, 73. Preferably, the angle $\alpha$ is in the range 5° to 85°, preferably 10° to 45°, more preferably 20° to 30°, most preferred about 22.5° corresponding to an included angle β of 157.5° of the angled channel sections 761, 762 of the flow channel (76). The two sections need not necessarily be formed as two straight channel sections 761, 762, but rounded shapes are conceivable as well.

Corresponding to the specific embodiment, the second opening 73 and the third opening 74 of the valve housing 71 are positioned such that a central angle between the second opening 73 and the third opening 74 is two times the relative angle α of the channel sections of the flow channel 76 of the rotatable diversion member 75. That is, the central angle is 45° in the embodiment shown.

The materials of the components of the sanitary two-way diverter valve 70 are chosen according to the specific requirements in the field of application of the drying system according to the invention. Typically, the valve housing 71 and the diversion member 75 are made from sanitary grade stainless steel.

In principle, the first and second positions of the diverter valve 70 of the valve assembly may in addition to being used for conveying fines in the conveying line 11 to distribute the fines to other operational units, also be used for purging the conveying lines and the valve assembly 7 itself. However, it is preferred that the spray drying system 1 comprises a cleaning-in-place, CIP, arrangement connected to said at least one purge line 10.

Thus, in addition to the arrangements for providing conveying air and purge air, arrangements for supplying CIP liquid and dry out air are also present in the spray drying system in the embodiment shown, although not indicated in detail in the drawings.

Figure 8:
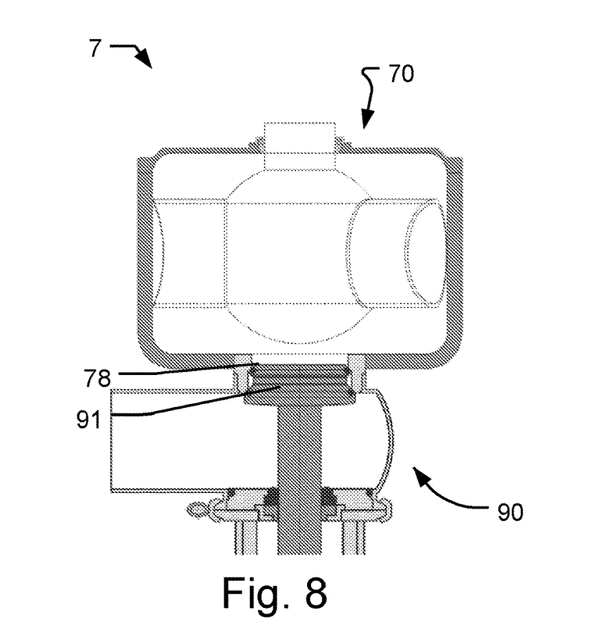
FIG. 8 is a side view of a valve assembly in an embodiment of the invention, in a closed position of a second valve.
Figure 9:
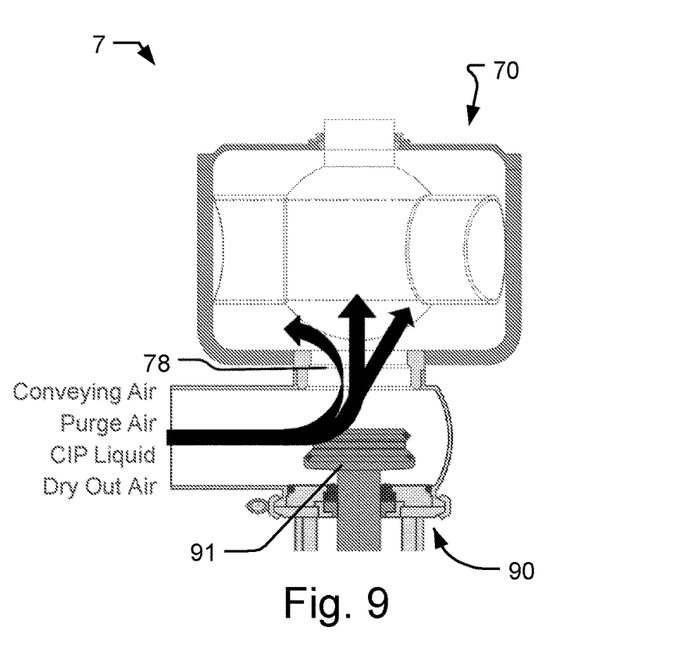
FIG. 9 is a side view of the valve assembly of FIG. 8, in an open position.

Turning now to FIGS. 8 and 9, the valve assembly 7 comprises a second valve 90 connected to the two-way diverter valve 70 via a fourth opening 78 included in the number of openings of the valve housing 71. The fourth opening 78 is in fluid connection with the open space 77 of the two-way diverter valve 70.

The second valve 90 is configured to be brought from a closed position shown in FIG. 8 to an open position shown in FIG. 9 in which it is in fluid connection with the conveying line 11 and the purge line 10 via the diverter valve 70.

In the embodiment shown in FIGS. 8 and 9, the second valve is a plug valve 90 having a plug end 91 adapted to close off the fourth opening 78 of the valve housing 71.

The flows through the valve assembly 7 of the preferred embodiment are thus shown in FIGS. 9, 10 and 11.

When it has been determined to carry out a CIP procedure, the CIP liquid is supplied to the valve assembly 7 and following cleaning, the CIP liquid may also be drained through the same lines and flow paths. Once the CIP liquid has been drained, dry out air is blown through the valve assembly 7, thereby drying and possibly also heating the entire valve assembly 7.

Figure 12:
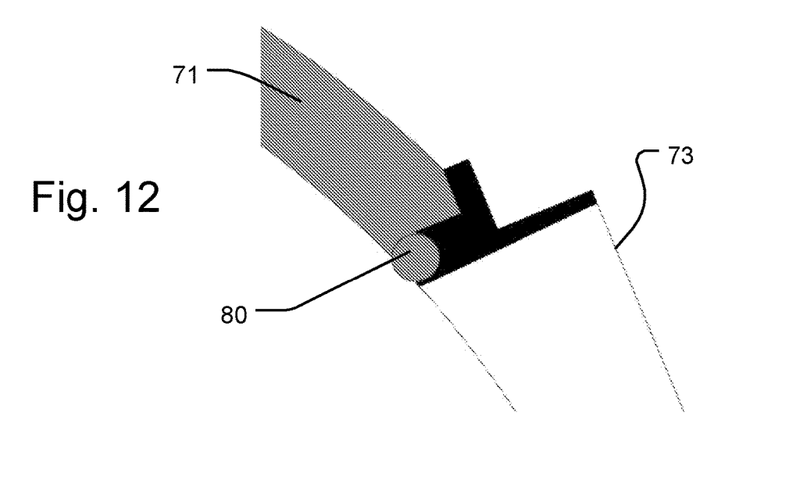
FIG. 12 is a schematic plan view of a detail of the valve assembly of FIG. 5, on a larger scale.

Referring now to FIG. 12, a seal 80 is provided between the valve housing 71 and one or more of the respective first, second and third openings 72, 73, 74 of the number of openings of the valve housing 71. In the embodiment shown, a seal 80 is provided at all the openings 71, 72, 73, the second opening 73 being shown.

Alternatively or additionally, a gap (not shown) may be provided between the valve housing 71 and one or more of the respective first, second and third openings 72, 73, 74 of the number of openings of the valve housing 71. By pressurising the valve housing 71 to a slight overpressure, it is prevented that powder penetrates from the conveying lines whereby contamination is prevented.

An alternative use of the valve assembly 207 is shown in FIG. 3, in which a by-pass arrangement is provided, comprising at least one further two-way diverter valve 270 connected to a secondary conveying line optionally connectable to a secondary destination.

The person skilled in the art realizes that the present invention by no means is limited to the preferred embodiments described above. On the contrary, many modifications and variations are possible within the scope of the appended claims.

The invention claimed is:

1. A drying system comprising at least one powder recovery unit, at least one conveying line for powdery material such as fines from the at least one powder recovery unit, at least one purge line connected to a purge arrangement, and a valve assembly comprising at least one sanitary diverter valve, the at least one sanitary diverter valve comprising:

a valve housing having a number of openings configured to be connected to respective lines of the drying system, wherein the valve housing is substantially cylindrical and includes a first opening, a second opening, and a third opening; and a rotatable diversion member provided with a flow channel having a first end and a second end, an open space being defined between the valve housing and the rotatable diversion member, wherein the rotatable diversion member is configured to be rotated between a first position in which the first end of the flow channel is located opposite the first opening of the valve housing and the second end of the flow channel is located opposite the third opening of the valve housing, and a second position in which the first end of the flow channel is located opposite the second opening of the valve housing and the second end of the flow channel is located opposite the first opening of the valve housing, such that fluid communication is selectively provided between the first opening and the third opening and between the first opening and the second opening of the valve housing; and that fluid communication is provided between the open space and the second opening of the valve housing in the first position and between the open space and the third opening of the valve housing in the second position, wherein the valve assembly comprises a second valve connected to the at least one sanitary diverter valve via a fourth opening included in the number of openings of the valve housing, the fourth opening being in fluid connection with the open space of the at least one sanitary diverter valve, and wherein the second valve is configured to be brought in fluid connection with the at least one conveying line and with the at least one purge line, and wherein the second valve is a plug valve having a plug end adapted to close off the fourth opening of the valve housing, and wherein the at least one sanitary diverter valve is connected to the at least one conveying line and the at least one purge line, such that the at least one sanitary diverter valve is configured to be operated as a two-way sanitary diverter valve selectively for liquid, air/gas, and/or powder.

2. A drying system according to claim 1, wherein the drying system comprises a spray dryer with a drying chamber and a process gas supply device.

3. A drying system according to claim 1, wherein the drying system comprises a cleaning-in-place, CIP, arrangement connected to the at least one purge line.

4. A drying system according to claim 1, wherein a by-pass arrangement is provided, comprising at least one further two-way sanitary diverter valve connected to a secondary conveying line that is configured to connect to a secondary destination.

5. A method for cleaning a system including one or more conveying lines and at least one purge line of a purge arrangement, and a valve assembly including at least one sanitary diverter valve wherein the at least one sanitary diverter valve of the valve assembly is connected to at least one of the one or more conveying lines in normal operation, the method comprising:
- determining that a cleaning-in-place (CIP) procedure is to be started;
- supplying CIP liquid through the at least one purge line to the valve assembly;
- after the CIP procedure of the system is complete, draining the CIP liquid from the system; and
- blowing drying air/gas through the valve assembly in order to dry the system,
- wherein the at least one sanitary diverter valve comprises:
  - a valve housing having a number of openings configured to be connected to respective lines of the system, wherein the valve housing is substantially cylindrical and includes a first opening, a second opening, and a third opening; that the at least one sanitary diverter valve furthermore comprises a rotatable diversion member provided with a flow channel having a first end and a second end, an open space being defined between the valve housing and the rotatable diversion member, wherein the rotatable diversion member is configured to be rotated between a first position in which the first end of the flow channel is located opposite the first opening of the valve housing and the second end of the flow channel is located opposite the third opening of the valve housing, and a second position in which the first end of the flow channel is located opposite the second opening of the valve housing and the second end of the flow channel is located opposite the first opening of the valve housing, such that fluid communication is selectively provided between the first opening and the third opening and between the first opening and the second opening of the valve housing; and that fluid communication is provided between the open space and the second opening of the valve housing in the first position and between the open space and the third opening of the valve housing in the second position, and
- wherein the valve assembly comprises a second valve connected to the at least one sanitary diverter valve via a fourth opening included in the number of openings of the valve housing, the fourth opening being in fluid connection with the open space of the at least one sanitary diverter valve, wherein the second valve is configured to be brought in fluid connection with the at least one of the one or more conveying lines and with the at least one purge line, and wherein the second valve is a plug valve having a plug end adapted to close off the fourth opening of the valve housing.

6. The method of claim 5, wherein the at least one sanitary diverter valve of the valve assembly is brought from the first position to the second position, or vice versa, following supply of the CIP liquid.

7. A method for cleaning a system including one or more conveying lines and at least one purge line of a purge arrangement, and a valve assembly including at least one sanitary diverter valve, wherein the at least one sanitary diverter valve of the valve assembly is connected to the at least one of the one or more conveying lines in normal operation, the method comprising:
- determining that a cleaning-in-place (CIP) procedure is to be started;
- supplying CIP liquid through the at least one purge line to the valve assembly;
- after the CIP procedure of the system is complete, draining the CIP liquid from the system; and
- blowing drying air/gas through the valve assembly in order to dry the system,
- wherein the at least one sanitary diverter valve comprises:
  - a valve housing having a number of openings configured to be connected to respective lines of the system, wherein the valve housing is substantially cylindrical and includes a first opening, a second opening, and a third opening; that the at least one sanitary diverter valve furthermore comprises a rotatable diversion member provided with a flow channel having a first end and a second end, an open space being defined between the valve housing and the rotatable diversion member; that the rotatable diversion member is configured to be rotated between a first position in which the first end of the flow channel is located opposite the first opening of the valve housing and the second end of the flow channel is located opposite the third opening of the valve housing, and a second position in which the first end of the flow channel is located opposite the second opening of the valve housing and the second end of the flow channel is located opposite the first opening of the valve housing, such that fluid communication is selectively provided between the first opening and the third opening and between the first opening and the second opening of the valve housing; and that fluid communication is provided between the open space and the second opening of the valve housing in the first position and between the open space and the third opening of the valve housing in the second position; and
- wherein the valve assembly comprises a second valve connected to the at least one sanitary diverter valve via a fourth opening included in the number of openings of the valve housing, the fourth opening being in fluid connection with the open space of the at least one sanitary diverter valve.

8. The method of claim 7, wherein the at least one sanitary diverter valve of the valve assembly is brought from the first position to the second position, or vice versa following the supplying of the CIP liquid.

* * * * *